United States Patent

Marosy

[15] 3,675,499

[45] July 11, 1972

[54] COUPLING

[72] Inventor: Andre Marosy, 24731 Kipling, Oak Park, Mich. 48236

[22] Filed: Sept. 18, 1970

[21] Appl. No.: 73,346

Related U.S. Application Data

[63] Continuation-in-part of Ser. No. 795,501, Jan. 31, 1969, Pat. No. 3,540,087, and a continuation-in-part of Ser. No. 782,176, Dec. 9, 1968, Pat. No. 3,540,091.

[52] U.S. Cl. ...................... 24/201 A, 24/221 R, 287/103 A
[51] Int. Cl. ............................................................ A44b 17/00
[58] Field of Search .......................... 24/221 R; 287/103 A; 26/201 SL, 201 D, 201 A, 230 BC, 230 TC

[56] References Cited

UNITED STATES PATENTS 1,199,690    9/1916    Gillan.................................24/221 R
3,487,512    1/1970    Marosy................................24/221 R

*Primary Examiner*—Bernard A. Gelak
*Attorney*—Hauke, Gifford and Patalidis

[57] ABSTRACT

A quick connect and disconnect coupling particularly adapted for connecting chains, wires, cables or other members together. The coupling generally comprises a male member and a female member with the female member including a slide member urged by a spring toward an end plate. The male member includes laterally extending flanges and the end plate has a slotted opening for receiving the male member. Locking the members together is accomplished by inserting the male member through the opening and against the slide member to move the slide member away from the end plate, rotating the male member and then releasing the male member to release the spring to thereby clamp the flanges of the male member between the slide member and the end plate.

8 Claims, 8 Drawing Figures

PATENTED JUL 11 1972 3,675,499

INVENTOR
ANDRE MAROSY

BY Hauke, Gifford & Patalides

ATTORNEYS

COUPLING

THE RELATIONSHIP TO OTHER PATENTS AND APPLICATIONS

This application is related to my prior U. S. Pat. No. 3,487,512, issued Jan. 6, 1970 and U.S. Pat. No. 3,286,316 issued Nov. 22, 1966 and is a continuation-in-part of my applications Ser. No. 795,501 filed Jan. 31, 1969, now U.S. Pat. No. 3,540,087 and Ser. No. 782,176 filed Dec. 9, 1968, now U.S. Pat. No. 3,540,091.

BACKGROUND OF THE INVENTION

I. Field of the Invention

This invention relates to the couplings and more particularly to an easily connected and disconnected coupling including means providing a positive locking engagement when the members are connected together.

II. Description of the Prior Art

My previous patents and applications have been directed to couplings suitable for use with jewelry or for connecting wires or cables together or for connecting such members as tubes, garden hoses, flexible support members such as ropes and the like. These connectors have also been useful in the automotive industry for such things as latching the hood of an automobile closed. In each of these situations it is desirable to provide a coupling which can be easily connected and disconnected and will positively lock in the connected condition and which will require a manual action to release the lock. In addition and especially with regard to automotive uses it is important that the cost of producing such a coupling be kept to a minimum.

SUMMARY OF THE INVENTION

The present invention is an improvement over the devices of my previous patents and applications with the improvement lying primarily in the provision of means positively retaining the male member in the rotated locked position and in the provision of a much more economically produced coupling than heretofore possible.

The coupling of the present invention generally comprises a male member and a female member. The female member is generally cylindrical in shape and has a slide member slidably mounted between its ends. The slide member is urged by a spring toward one end of the female member and that end of the female member receives the male member. The slide member is formed with a pair of cooperating surfaces formed as helical spirals. The female member also includes an end plate having a slotted opening and a male member includes laterally extending flange portions adapted to be received through the slotted opening of the end plate. The connection between these members is produced by inserting the male member through the slotted opening of the female member and against the slide member to compress the spring until the flange portions of the male member clear the inside surface of the end plate. The male member is then rotated along the helical surfaces to a position in which the flange portions have been rotated past the slotted opening.

To disconnect the male member from the female member the male member must be rotated in the opposite direction and against the inclined surface of the slide member. Rotation of the male member in this direction is resisted by the spring since rotation requires the slide member to be moved downwardly against the spring. As a further precaution against unintentional disconnection of the male member from the female member a pin is mounted on the end plate with a surface cammed in such a way that rotation of the flange past the pin in a locking direction is easily accomplished but to rotate the male member to the unlocking position requires that the male member first be forced inwardly against the slide member to pass the pin.

In place of the housing usually provided with these kinds of couplings the coupling of the present invention includes a female member which is constructed of two end plates held together by a pair of rods. The slide member must be prevented from rotating and this is accomplished by providing grooves on opposite sides of the slide member which receive the rods to thereby prevent rotation while permitting the slide member to be axially slidable along the rods. This substantially reduces the cost of constructing such couplings and is especially useful in those assemblies in which the female member is completely enclosed within one of the devices to be coupled so that the coupling housing forms no useful purpose anyway.

DESCRIPTION OF THE DRAWING

A better understanding of the present invention will be apparent upon reference to the following description. The description refers to the accompanying drawings in which like reference characters refer to like parts throughout the several views and in which.

DESCRIPTION OF THE PREFERRED EMBODIMENT

Figure 1:
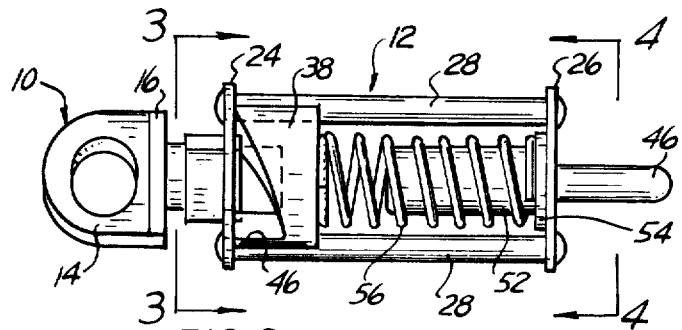
FIG. 1 is a side elevational view of a coupling embodying the present invention.
Figure 2:
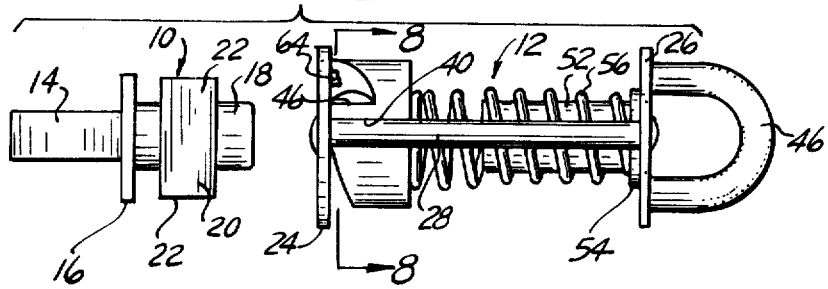
FIG. 2 is a view with a coupling illustrated in FIG. 1 but with the male member disengaged from the female member and as viewed substantially from the top of FIG. 1.

Now referring to the drawings for a more detailed description of the present invention a coupling comprises a male member 10 and a female member 12. The male member 10 is preferably of a one piece construction having a generally flat semi-circular ring portion 14 formed at one end. A collar 16 is formed adjacent the ring portion 14 and a rod 18 extends axially from the collar 16. As can best be seen in FIG. 2 the rod 18 is formed with an intermediate, generally rectangular flat piece 20 which forms a pair of flanges 22 displaced at 180° with respect to each other and extending in diametrically opposite directions and radially outwardly beyond the surface of the rod 18.

The female member 12 preferably comprises a pair of circular end plates 24 and 26 maintained in a spaced relationship by a pair of rods 28. The rods 28 are fastened adjacent the outer edges of the end plates 24 and 26 in a substantially parallel relationship by any convenient means such as a reduced end section extending through an aperture in the end plate and then flattened in the manner of a rivet.

Figure 7:
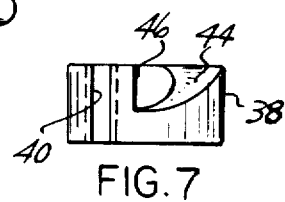
FIG. 7 is a perspective view of the slide member of the present invention.

A slide member 38 which is best shown in FIG. 7 is slidably mounted between the two end plates 24 and 26. A pair of longitudinally extending grooves 40 are formed on the periphery of the slide member 38 such that when the female member 12 is assembled the rods 34 fit within the grooves 40. The rods 34 then not only act to hold the end plates 24 and 26 together but provide the means for guiding the sliding movement of the slide member 38 while at the same time preventing the slide member 38 from rotating. The slide member 38 is formed from a substantially cylindrical piece of material and is provided with a central bore 42 of slightly greater diameter than the rod 18 of the male member 10. A pair of helical, spirally formed surfaces 44 are provided at the end of the slide member 38 adjacent the end plate 24. The surfaces 44 are formed intermediate the grooves 40 and extend generally downwardly from the end plate 24 in a clockwise direction and terminate in a substantially axially extending surface 46 adjacent the groove 40.

The end plate 26 of the female member 12 includes a generally flat semi-circular ring portion 46. An aperture 50 is provided through the center of the end plate 26 to receive one end of a substantially cylindrical spring guide 52. The spring guide 52 is prevented from passing completely through the aperture 50 by an enlarged diameter collar portion 54 which abuts against the inner surface of the end plate 26. A helical compression spring 56 having a diameter larger than the bore 42 is disposed over the spring guide 52 to engage the slide member 38 and to bias the slide member 38 toward the end plate 24.

Figure 3:
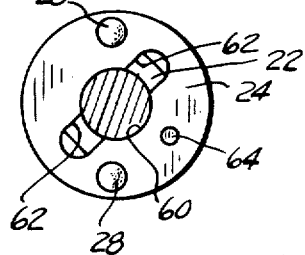
FIG. 3 is a transverse cross sectional view taken substantially on line 3—3 of FIG. 1.
Figure 4:
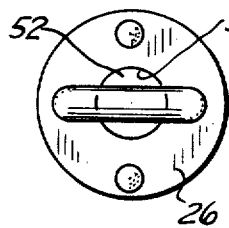
FIG. 4 is an end view taken from the righthand side of FIG. 1.
Figure 8:
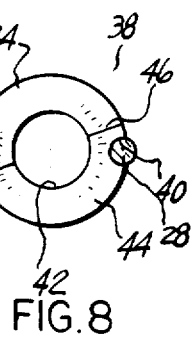
FIG. 8 is a transverse cross sectional view taken substantially at lines 8—8 of FIG. 2.
Figure 5:
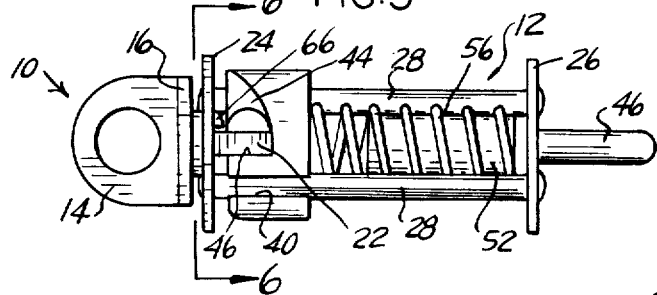
FIG. 5 is a view similar to FIG. 1 but illustrating the device in a locked or connected position.

As can best be seen in FIG. 3, the end plate 24 includes a central opening 60 of a diameter sufficient to receive the rod 18 of the male member 10 and a pair of laterally extending oppositely disposed slots 62 dimensioned to receive the flanges 22 of the male member 10. The slots 62 are disposed adjacent the rods 28 in the area in which the surfaces 44 of the slide member 38 are most closely adjacent the end plate 24. A pin 64 extends inwardly from the end cap 24 at a point adjacent one of the surfaces 46 of the slide member 38. As can best be seen in FIG. 5, the pin 64 is provided with a cam surface 66 which is tapered downwardly from the end cap 24 in a clockwise direction and is spaced sufficiently from the surface 46 to permit the flanges 22 of the member 20 to be disposed therebetween.

It is to be understood that the coupling of the present invention can be used to connect various types of members together. Thus the rings 14 and 46 could be connected to the links of a chain for connecting necklaces or other chains of various sizes together. Likewise the female member 12 could be mounted in any other assembly in a position to receive the male member to produce the desired connection. For instance the female member 12 could be a part of the body of an automobile and the male member 10 could be mounted to engage and lock with the female member 12 when the hood of the automobile is closed. There are a number of uses for the coupling devices of the present invention and this application is not intended to be limited to any particular use.

Figure 6:
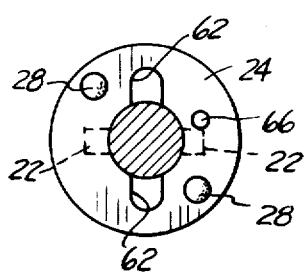
FIG. 6 is a transverse cross sectional view taken substantially on line 6—6 of FIG. 5.

To lock the male member 10 to the female member 12 the rod 18 of the male member 10 is inserted through the opening 60 of the end plate 24 with the flanges 22 aligned with the slots 62. This insertion will cause the leading edge portion of the rod 18 to be received in the bore 42 of the slide member 38 and will cause the leading edges of the flanges 22 to engage the helical surfaces 44. The male member 10 is then pushed inwardly to move the slide member 38 along the rods 28 until the outermost edges of the flanges 22 clear the inner surface of the end plate 24. The male member 10 then can be rotated in a clockwise direction to bring the flanges 22 to the position illustrated in FIGS. 5 and 6.

Releasing the male member 10 will permit the spring 56 to move the slide member 38 towards the end cap 24 and thereby securely clamp the flanges 22 between the slide member 38 and the end plate 24. As in my previous inventions since it is necessary to move the slide member 38 inwardly as the male member is being rotated in a counterclockwise position to thereby unlock the members the spring 56 effectively resists separation of the male member 10 from the female member 12. In addition the pin 64 requires that the male member 10 be pushed inwardly into the female member 12 a sufficient distance for the upper edge of the flanges 22 to be moved past the cam surface 66. Thus the pin 64 aids in providing a positive locking connection between these members.

By providing the rods 28 to guide the sliding movement of the slide member 38 and to prevent rotation of the slide member 38 while at the same time holding the end plates 24 and 26 in a spaced position a substantial savings in manufacturing costs has been achieved. In effect the rods 28 eliminate the necessity of a housing, a central guide pin for the slide member 38 and separate means for preventing rotation of the pin 38. In this way the cost of providing a coupling of this type can be substantially reduced making it useful for a wide variety of new applications.

Although I have described but a single embodiment of my present invention it is apparent that many other changes can be made without departing from the spirit or the scope of the present invention.

I claim:

1. A coupling comprising:
a male member and a female member, said male member having an end portion with at least one lateral extension, said female member comprising a pair of end members and at least one elongated member extending between said end members to maintain the end members in a spaced position, one of said end members having a slotted opening for receiving the end portion of said male member when said lateral extension is properly aligned with said slotted opening, a slide member having a groove slidably mounted on said elongated member intermediate said end members, means biasing said slide member in a direction toward said slotted end member whereby upon insertion of said male member through said slotted opening and rotation of said end member and rotation of said male member in one direction to move said lateral extension from alignment with said slotted opening and release of said male member, said spring urges said slide member against said lateral extension to clamp said lateral extension between said slide member and said end member and to lock said male member to said female member.

2. The coupling as defined in claim 1 in which said slide member is provided with a surface adjacent said slotted end member, said surface being inclined in a direction away from said slotted end member in the direction of rotation of said male member to the locking position.

3. The coupling as defined in claim 1 and including means extending from said slotted end member into the path of rotation of said lateral extension from the locked to the unlocked position.

4. The coupling as defined in claim 1 and including means mounting said biasing means to the end member opposite said slotted end member.

5. A coupling comprising a male member and a female member, said male member having an end portion with a laterally extending section forming a pair of flanges disposed radially outwardly from said end portion, said female member comprising a pair of end plates and a pair of elongated rods extending between said end plates and secured to said end plates to maintain the end plates in a spaced coaxial position, one of said end plates having a slotted opening for the end portion of said male member when said flanges are properly aligned with said slotted opening, a slide member having a pair of oppositely disposed axially extending peripheral grooves receiving said rods whereby said slide member is slidably mounted on said rods between said end plates, a spring member and means mounting said spring member to the end plate opposite said slotted end plate to bias said slide member in a direction toward said slotted end plate whereby insertion of said male member through said slotted opening and rotation of said male member produces engagement between said male member and said slide member and rotation of said male member to a locking position is resisted by said spring member.

6. A coupling as defined in claim 5 and in which said slide member is provided with a pair of helical, spirally formed surfaces disposed to be engaged by said flanges upon insertion of said male member through said slotted opening, said surfaces being inclined downwardly away from said slotted end plate in the direction of rotation of said male member toward the locked position.

7. The coupling as defined in claim 5 and including a pin carried by said slotted end plate and extending toward said slide member in a position to retain one of said flanges in a locked position, said pin having a cam surface permitting rotation past said pin in a direction toward said locking position but requiring said slide member to be moved axially inwardly to permit passage of said flange portion upon rotation of said male member away from said locked position.

8. The coupling as defined in claim 5 and including a substantially cylindrical member carried by the end plate opposite said slotted end plate and extending between said end plates, said spring being mounted to said cylindrical member.

* * * * *